United States Patent [19]
Jun

[11] Patent Number: 6,040,868
[45] Date of Patent: Mar. 21, 2000

[54] DEVICE AND METHOD OF CONVERTING SCANNING PATTERN OF DISPLAY DEVICE

[75] Inventor: Sung-Gon Jun, Kyungki-do, Rep. of Korea

[73] Assignee: SamSung Electronics Co., Ltd., Kyungki-do, Rep. of Korea

[21] Appl. No.: 08/801,783

[22] Filed: Feb. 14, 1997

[30] Foreign Application Priority Data

Feb. 17, 1996 [KR] Rep. of Korea ......................... 96/3969

[51] Int. Cl.$^7$ ............................. H04N 7/01; H04N 11/20
[52] U.S. Cl. ........................................... 348/448; 348/452
[58] Field of Search ..................... 348/488, 452, 348/450, 448

[56] References Cited

U.S. PATENT DOCUMENTS

| | | | |
|---|---|---|---|
| 4,509,071 | 4/1985 | Fujimura et al. ....................... | 348/450 |
| 4,524,379 | 6/1985 | Okada et al. . | |
| 4,539,592 | 9/1985 | Tanaka et al. .......................... | 348/448 |
| 4,602,273 | 7/1986 | Carlson . | |
| 4,603,350 | 7/1986 | Arbeiter et al. ........................ | 348/448 |
| 4,698,674 | 10/1987 | Bloom .................................... | 348/448 |
| 4,723,163 | 2/1988 | Skinner .................................. | 348/448 |
| 4,959,715 | 9/1990 | Prodan ................................... | 348/448 |
| 5,049,994 | 9/1991 | Nakamura . | |
| 5,081,532 | 1/1992 | Rabii ...................................... | 348/452 |
| 5,428,397 | 6/1995 | Lee et al. ............................... | 348/448 |
| 5,444,494 | 8/1995 | Yamamoto et al. . | |
| 5,663,765 | 9/1997 | Matsuse et al. ........................ | 348/448 |

Primary Examiner—Andrew I. Faile
Assistant Examiner—Dinh Cao Peter Chu
Attorney, Agent, or Firm—Robert E. Bushnell, Esq.

[57] ABSTRACT

A video display converting circuit for converting scanning patterns from interlaced scanning to sequential scanning of a display device includes an input terminal for receiving an input interlaced scanning video signal having alternating odd and even fields of scanning lines; a first line memory for storing picture elements of the input interlaced scanning video signal in a first line of an odd field; a second line memory for storing picture elements of the input interlaced scanning video signal in a last line of an even field; a plurality of sequential line memories for storing picture elements of the input interlaced scanning video signal in sequence for each scanning line; a demultiplexer for sequentially inputting the picture elements of the input interlaced scanning video signal into each of the first line memory, the second line memory and each of the plurality of sequential line memories in accordance with a write clock signal; a first multiplexer for producing a first output signal by multiplexing between the picture elements of the input interlaced scanning video signal stored in one of the first line memory, the second line memory and selected one from the plurality of sequential line memories in accordance with a read clock signal; an interpolator for interpolating picture elements between adjacent scanning lines of the input interlaced scanning video signal in one of the odd field and the even field to produce interpolated picture elements; a second multiplexer for producing a second output signal representing a sequential scanning video signal by multiplexing between the picture elements contained in the first output signal and the interpolated picture elements provided from the interpolator; and a control section for controlling operations of each of the demultiplexer, the first and second demultiplexers.

10 Claims, 5 Drawing Sheets

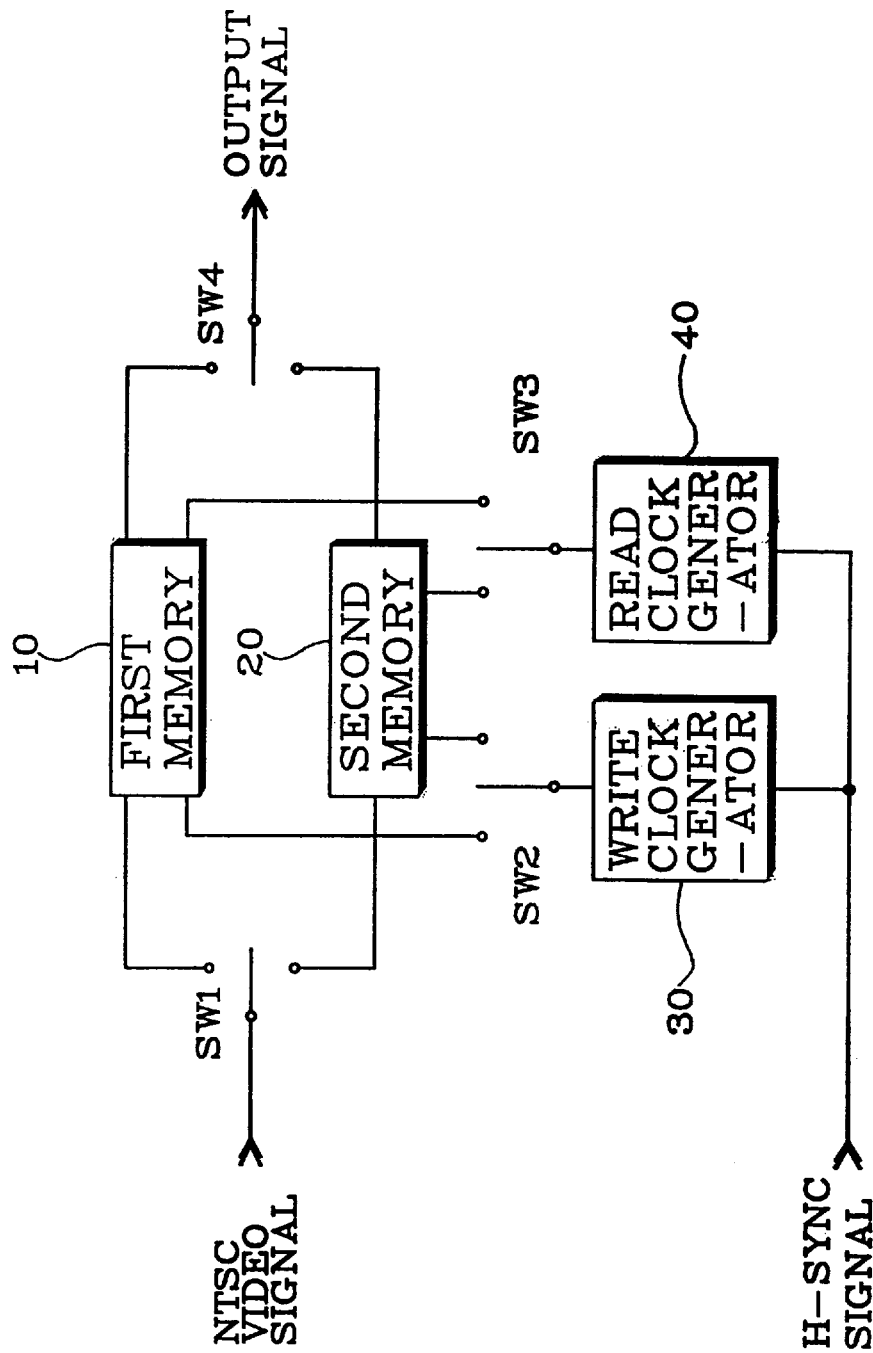

DEVICE AND METHOD OF CONVERTING SCANNING PATTERN OF DISPLAY DEVICE

CLAIM FOR PRIORITY

This application makes reference to, incorporates the same herein, and claims all benefits accruing under 35 U.S.C. §119 from an application for Device For And Method Of Converting Scanning Pattern Of Display Device earlier filed in the Korean Industrial Property Office on Feb. 17, 1996 and there duly assigned Ser. No. 3969/1996.

BACKGROUND OF THE INVENTION

1. Technical Field

The present invention relates to a device for and a method of converting scanning patterns of a display device and, more particularly, to a device for and a method of converting interlaced scanning into sequential scanning in a display device so as to reproduce stable images on the screen.

2. Background Art

Generally, cathode-ray tube displays ("CRT") direct an electron beam from left to right in a horizontal direction starting from top to bottom of a picture frame so as to produce a visual representation of an image. The process of deflecting an electron beam successively over all points in a given region is known as "scanning" and the image which is visually reproduced in spots or lines on the scanning lines of the CRT screen is called "scanning spot". Scanning is similar to the progression of the line of vision in reading a page of recording media in line-by-line, left-to-right, top-to-bottom dissection and reconstitution of images.

There are known two scanning patterns used to reproduce a visual representation of an image. The first scanning pattern is known as "interlaced" scanning, and the second scanning pattern is known as "sequential" scanning. Sequential scanning is accomplished by increasing the downward rate of travel of the scanning electron beam so that every successive line is sent. An image on the picture tube screen is formed by moving the electron beam back and forth as it scans individual lines successively. The interlaced scanning is accomplished by increasing the downward rate of travel of the scanning electron beam so that every other line is sent, rather every successive line. When the bottom of the image is reached, the electron beam is sent back to the top of the image. Then, the lines that were skipped in the previous scanning are sent, the initial set of scanning lines is assumed to start at the upper left portion of the picture frame, and then every other line is scanned. The field produced is known as the "odd-line" field. When the "odd" field is completed, the beam retraces rapidly to the upper middle portion of the picture frame. From the upper middle portion of the picture frame, the "even-line" field is developed by scanning even set of scanning lines. Interlaced scanning was developed to increase the number of scanning lines as much as possible in order to reduce undesirable flick in the picture and yet remain within the limited frequency band available for transmission.

As large screen CRT displays have become more common, however, visual characteristics such as flicker and blur of a picture have become more noticeable. A number of high quality picture display systems has been developed in an effort to improve the vertical resolution of a picture through the use of sequential line scanning without the need for the improvement or change of existing systems. Many picture display systems such as disclosed in U.S. Pat. No. 5,444,494 for Video Signal System Converting Circuit For Processing Video Signal Having Interlaced Scanning Lines To Produce Video Signal Having Sequential Scanning Lines issued to Yomamoto et al., U.S. Pat. No. 5,049,994 for System For Converting Interlaced Video Signals To Sequential Video Signals issued to Nakamura, U.S. Pat. No. 4,602,273 for Interpolated Progressive-Scan Television Displa With Line-Crawl Artifact Filtration issued to Carlson, and U.S. Pat. No. 4,524,379 for Double Scanning Non-Interlace Television Receiver With Vertical Aperture Correction Circuit issued to Okada et al., have endeavored to improve the picture quality by converting an interlaced scaning video signal into a sequential scanning video signal. However, many display systems still reproduce jagged images on screen primarily because of the reduction of the vertical resolution. As a result, further improvements can still be made.

SUMMARY OF THE INVENTION

It is therefore an object of the present invention to provide a video display converting circuit for converting an interlaced scanning video signal into a sequential scanning video signal.

It is also an object to provide a method of converting interlaced scanning into sequential scanning in a video display device so as to reproduce stable images on a screen.

To achieve these and other advantages, a video display converting circuit for converting scanning patterns from interlaced scanning to sequential scanning of a display device as constructed according to the principles of the present invention includes an input terminal for receiving an input interlaced scanning video signal having alternating odd and even fields of scanning lines; a first line memory for storing picture elements of the input interlaced scanning video signal in a first line of an odd field; a second line memory for storing picture elements of the input interlaced scanning video signal in a last line of an even field; a plurality of sequential line memories serving as buffers for storing picture elements of the input interlaced scanning video signal in sequence for each scanning line; a demultiplexer for sequentially inputting the picture elements of the input interlaced scanning video signal into each of the first line memory, the second line memory and each of the plurality of sequential line memories in accordance with a write clock signal; a first multiplexer for producing a first output signal by multiplexing between the picture elements of the input interlaced scanning video signal stored in one of the first line memory, the second line memory and selected one from the plurality of sequential line memories in accordance with a read clock signal; an interpolator for interpolating picture elements between adjacent scanning lines of the input interlaced scanning video signal in one of the odd field and the even field to produce interpolated picture elements; a second multiplexer for producing a second output signal representing a sequential scanning video signal by multiplexing between the picture elements contained in the first output signal and the interpolated picture elements provided from the interpolator; and a control section for controlling operations of each of the demultiplexer, the first and second demultiplexers.

The control section as constructed according to the present invention includes a synchronization detector for detecting a horizontal synchronizing signal from the input interlaced scanning video signal; a line detector for counting the number of lines in a current field of the input interlaced scanning video signal; a field detector for determining whether the current field of the input interlaced scanning video signal is one of the "odd" field and the "even" field; and a scanning line selector for enabling the second multiplexer to produce the sequential scanning video signal to be displayed on a display screen according to the sequential number of scanning lines in the current field in which the interlaced scanning video signal is currently input.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 2 is a circuit diagram of an exemplary video display converting circuit for converting scanning patterns from interlaced scanning into sequential scanning;

DETAILED DESCRIPTION OF THE PREFERRED EMBODIMENT

Figure 1B:
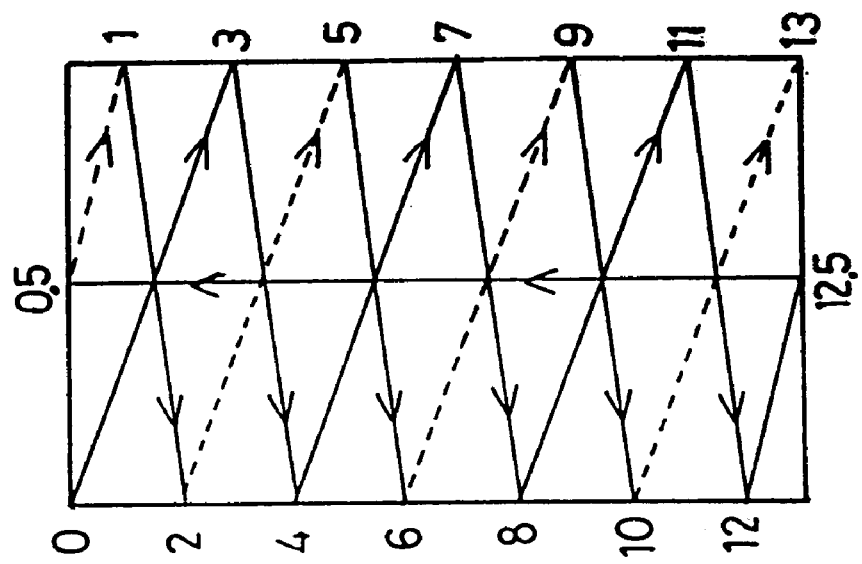
FIGS. 1A and 1B illustrate the path of an electron beam in sequential and interlaced scanning patterns respectively, on a screen.
Figure 1A:
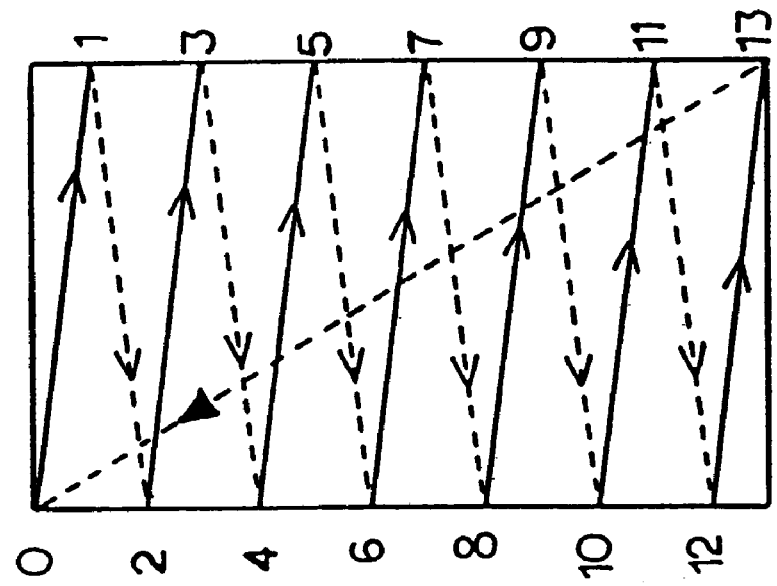

Referring now to the drawings and particularly to FIGS. 1A and 1B which illustrate the path of an electron beam in sequential and interlaced scanning patterns respectively, on a display screen. Sequential scanning is accomplished as shown in FIG. 1A by increasing the downward rate of travel of the scanning electron beam so that every successive line is sent. An image on the picture tube screen is formed by moving the electron beam back and forth from left to right as it scans individual lines successively until it reaches the bottom of the screen, in sequence as 0→1→2→3→4→5→6→8→9→10→11→12→13→0→1→2→3 . . .

In interlaced scanning as shown in FIG. 1B, scanning spot processes as 0→3→4→7→8→11→12→12.5→0.5→1→2→5→6→9→10→ . . . The scanning spot is made two repetitive motions simultaneously, one of which is a horizontally directed back-and-forth motion in zigzag fashion and the other is a vertical down-and-up motion. When the beam reaches the midline at the bottom of the screen, that is, the point 12.5, it moves upward to the point 0.5 as rapidly as possible. This time, a first field having "even" lines is scanned. At this point, the beam starts downward to scan a second field as before, and the second field has "todd" r lines that are interlaced with the "even" lines of the first field.

FIG. 2 illustrates an exemplary video display converting circuit that is used in recent video display systems to convert scanning patterns from interlaced scanning into sequential scanning. As shown in FIG. 2, the exemplary converting circuit includes an input terminal for receiving an input NTSC interlaced scanning video signal, first and second memories 10 and 20 each for storing the scanning line signals corresponding to a horizontal period, and read and write clock generators 30 and 40 for generating a write clock signal having a timing corresponding to a horizontal synchronizing H-SYNC signal separated from the NTSC video signal. The NTSC video signal is sent to the first and second memories 10 and 20 by a first switch SW1. The horizontal synchronizing signal is transmitted to read and write clock generators 30 and 40 which, in turn, supply the write and read clock signal corresponding to the horizontal synchronizing signal to the first and second memories 10 and 20 byway of second and third switches SW2 and SW3, respectively. Fourth switch SW4 is used to control the first and second memories 10 and 20 to produce an output sequential scanning video signal.

Figure 3A:
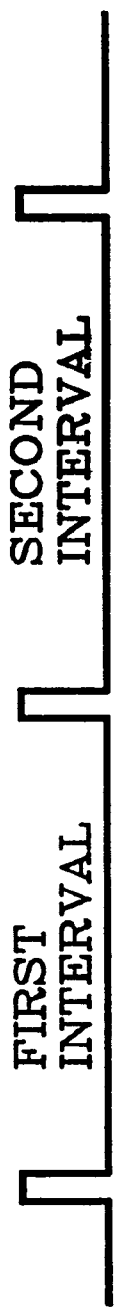
FIGS. 3A through 3D are waveform diagrams of the exemplary video display converting circuit as shown in FIG. 2.
Figure 3B:
Figure 3C:
Figure 3D:
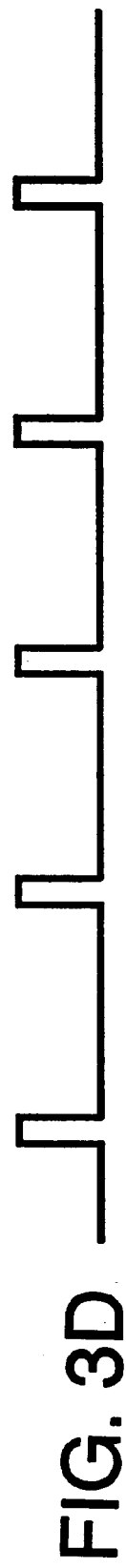

FIG. 3A illustrates the waveform of the input horizontal synchronizing signal. The write clock signal is alternately supplied to each of the first and second memories 10 and 20 during every other horizontal period as shown in FIG. 3B so that a video signal corresponding to each horizontal period is written therein. During the alternating horizontal period, the read clock signal is supplied to the other one of memories 10 and 20 as shown in FIG. 3C and the video signal stored therem during the preceding horizontal period is read out twice. FIG. 3D illustrates the waveform of the horizontal synchronizing signal displayed by operations of the first and second memories 10 and 20.

When the horizontal synchronizing signal is input during the first interval of FIG. 3A, the first memory 10 produces a write signal by the pulse generated by the write clock generator 30 as shown in FIG. 3B, and the second memory 20 produces a read signal two times by the pulse generated by the read clock generator 40. Thus, as shown in FIG. 3D, a piece of image data is displayed two times by one horizontal synchronizing signal which appears in the same interval (i.e., the first interval). In other words, after the input NTSC video signal is sampled and stored in a line memory, the data of one line is displayed on a first scanning line and again reproduced on the next scanning line.

With a sampling frequency $F_W$ and a clock frequency $F_R$ for reading and displaying the data of the line memory, the relationship between the two frequencies can be represented by the following is equation (1):

$$F_R = 2 \times F_W \tag{1}$$

In the exemplary video display converting circuit as described above, while stable images may be displayed on the screen by scanning the image of 525 line/frame as that of 262.5 line/frame with two fields, that is, "odd" and "even" lines, and thus doubling the scanning lines, the displayed image on the screen remains jagged and rough because the vertical resolution is reduced by half.

Figure 4:
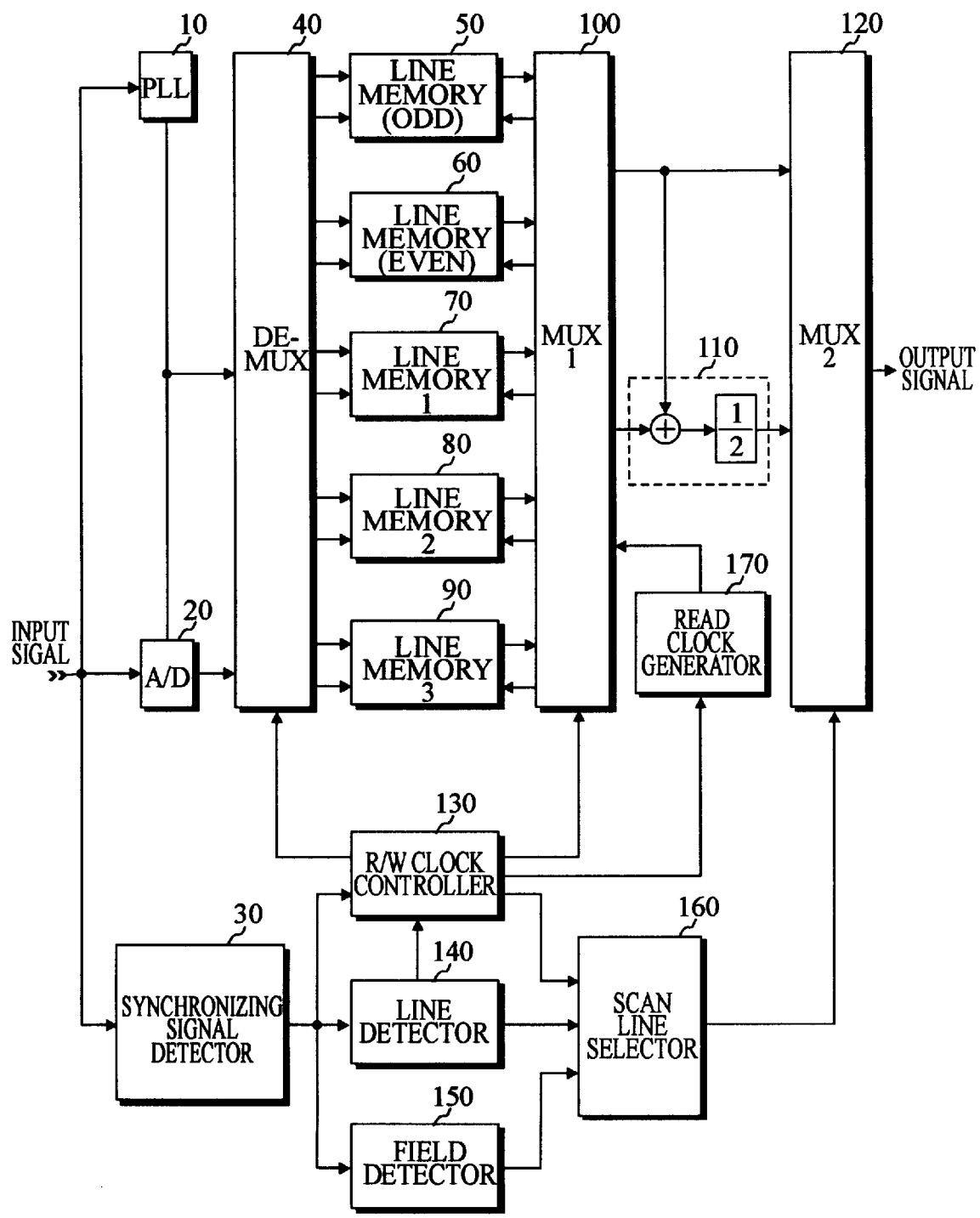
FIG. 4 is a circuit diagram of a video display converting circuit for converting scanning patterns from interlaced scanning into sequential scanning as constructed according to the principles of the present invention.

Refer now to FIG. 4 which illustrates a video display converting circuit for converting scanning patterns from interlaced scanning to sequential scanning in accordance with the preferred embodiment of the present invention. As shown in FIG. 4, the video display converting circuit includes a phase locked loop PLL 10, an analog-to-digital A/D convertor 20, a synchronizing signal detector 30, a demultiplexer DEMUX 40, a plurality of line memories 50–90, a first multiplexer MUX1 100, a calculator or interpolator 110, a second multiplexer MUX2 120, a read/write clock controller 130, a line detector 140, a field detector 150 and a scan line selector 160 for selecting an output of the second MUX2 120.

The PLL 10 receives an input interlaced scanning video signal from a receiver section which is typically formed by a tuner and an intermediate frequency amplifier, and provides the same for the scanning conversion. The A/D convertor 20 converts the interlaced scanning video signal into a digital format. The synchronizing signal detector 30 detects a horizontal synchronizing signal from the input interlaced scanning video signal. The demultiplexer DEMUX 40 is connected to the PLL 10 and the A/D converter 20 to receive the signals of the PLL 10 and the A/D converter 20. The output signal of the DEMUX 40 is sent to line memories 50 through 90, and those signals of the line memories are sent to the first multiplexer MUX 100. The line memories 50 through 90 can be divided into two line memories 50 and 60 for an edge-line storage and three sequential line memories 70, 80 and 90. The output signal of the first MUX 100 is transferred to the second multiplexer MUX 120 via the calculator 110 so as to reproduce an image on the screen.

The output signal of the synchronizing signal detector 30 is sent to the read/write clock controller 130, the line detector 140, the field detector 150 and lastly the scanning line selector 160 connected to the rear end of read/write clock controller 130, the line detector 140 and the field detector 150. The output signal of the read/write clock controller 130 is sent to the first MUX 100 via the DEMUX 40, the first MUX 100 and a read clock generator 170. The read/write clock controller 130 receives the output signal of the line detector 140.

The video display converting circuit as constructed according to the principles of the present invention seeks to interpolate the input interlaced scanning video signal by way of the calculator or interpolator 110 through scanning lines of two types, that is, "odd" and "even" lines in the fields, as shown in Table 1 below.

TABLE 1

| Original Image | Odd Field | Even Field | Odd Interpolation | Even Interpolation |
|---|---|---|---|---|
| $a_0$ | $a_0$ | | | $a_0$ |
| $b_0$ | | $b_0$ | $b' = (a + c)/2$ | |
| $c_0$ | $c_0$ | | | $c' = (b + d)/2$ |
| $d_0$ | | $d_0$ | $d' = (c + e)/2$ | |
| $e_0$ | $e_0$ | | | $e' = (d + f)/2$ |
| $f_0$ | | $f_0$ | $f' = (e + g)/2$ | |
| $g_0$ | $g_0$ | | | $g' = (f + h)/2$ |
| $h_0$ | | $h_0$ | $h' = h(t - 1)$ | |

As a scanning spot of the same image has a high correlation with its adjacent scanning spot, we can express that $b \approx b'$, $c \approx c'$, $d \approx d'$, $e \approx e'$, $f \approx f'$ and $g \approx g'$. While a video signal of the odd field is input, outputs are in the order of ab'cd'ef'gh'. With the input of a video signal of the even field, the values of abc'de'fg'h are generated in sequence. The values, which are interpolated after removing the luminance difference between the first and second lines, are approximate with actual ones in order to improve the quality of images. The data in the first line of the odd field and the last line of the even field are stored in the two line memories 50 and 60 so as to be used as interpolation signals and those of middle lines are stored in the three sequential line memories 70, 80 and 90 so as to be used as operational values for the interpolation signals of the display.

The operations of respective components of the video display converting circuit as shown in FIG. 4 may be described in detail as follows.

First, the first and second line memories 50 and 60 store data in the first line of the odd field and the last line of the even field, respectively. The three line memories 70, 80 and 90 serve as buffers for storing and reading the data entered on each line. With line and field information received from the synchronizing signal detector 30, the read/write memory controller 130 designates a line memory to store the input data, excites a write clock circuit, designates a memory to read and excites a read clock circuit. In addition, the read/write memory controller 130 controls the DEMUX 40 and the first MUX 100 so as to control the input/output of the data from the designated line memory.

Figure 5:
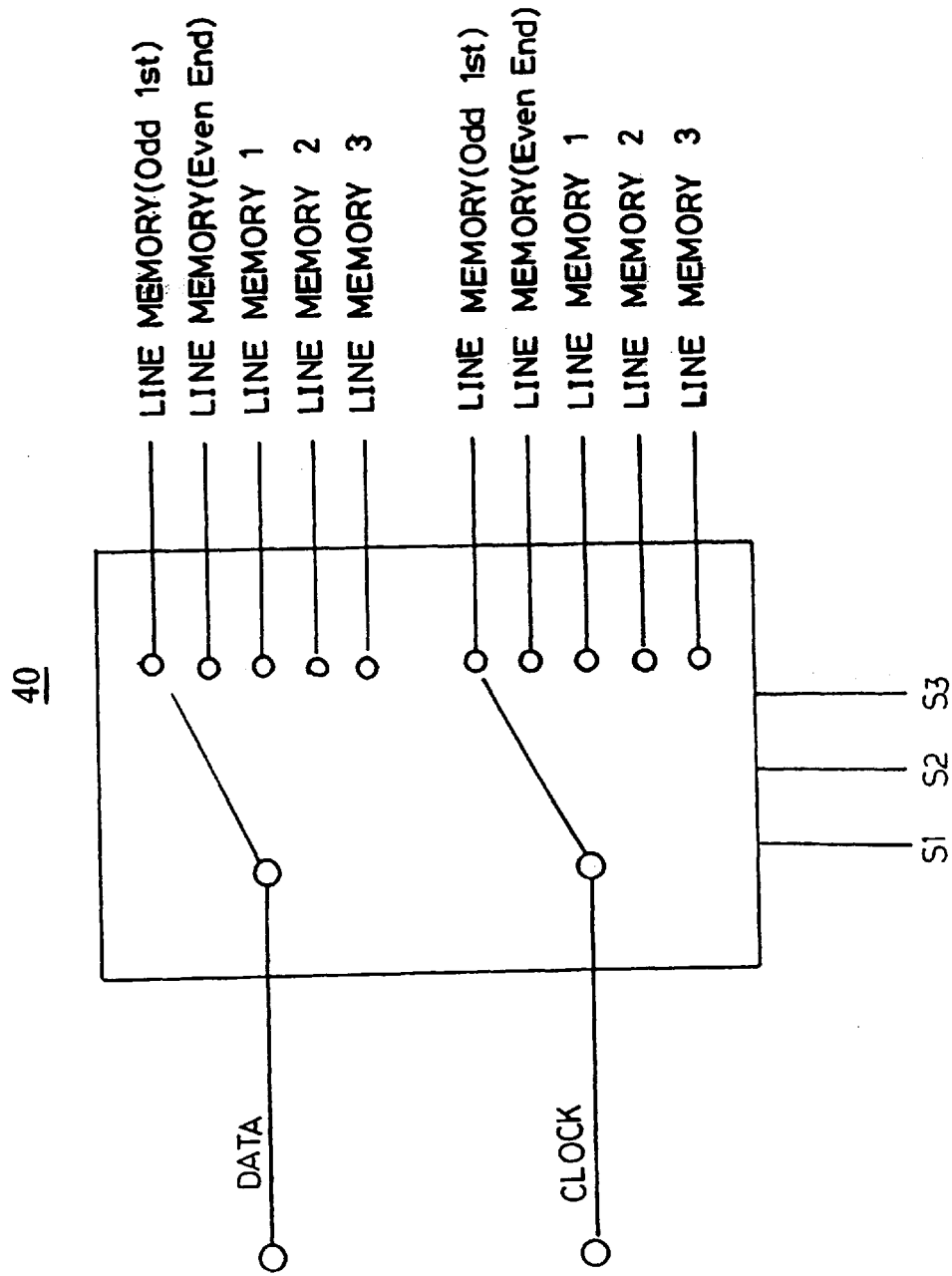
FIG. 5 is a circuit diagram illustrating the operation of the demultiplexer DEMUX as shown in FIG. 4.

Referring now to FIGS. 4 and 5 the DEMUX 40 transmits the data input from the PLL 10 to the line memories 50 through 90 in response to the write clock signal generated from the read/write memory controller 130. The first MUX 100 reads the input data of the line memories 50 through 90 in response to the read clock signal generated from the read/write clock controller 130 and sends the same read data to the line of input signal. The second MUX 120 selects one of data received via the first MUX 100 or the data interpolated with the average data of the lines by the calculator 110 so as to produce an output sequential scanning line.

The synchronizing signal detector 30 detects synchronizing information from the input interlaced video signal, and sends the same to the line and field detectors 140 and 150. At this time, the line detector 140 counts the sequential number of scanning lines in the field, and the field detector 150 checks on whether the currently input data is in an odd line or in an even line. Then, the results are sent to the scanning line selector 160. The scanning line selector 160 generates a signal for selecting a data line to be displayed on a CRT by confirming the sequential number of the line and the field to which data is currently input.

While there have been illustrated and described what are considered to be preferred embodiments of the present invention, it will be understood by those skilled in the art that various changes and modifications to the video display converting circuit for converting scanning patterns from interlaced scanning to sequential scanning may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A device for converting scanning patterns from interlaced scanning to sequential scanning, comprising:

means for receiving an input interlaced scanning video signal having alternating odd and even fields of scanning lines;

a first line memory for storing picture elements of the input interlaced scanning video signal in a first line of an odd field;

a second line memory for storing picture elements of the input interlaced scanning video signal in a last line of an even field;

a plurality of sequential line memories serving as buffers for storing picture elements of the input interlaced scanning video signal in sequence for each scanning line;

a demultiplexer for sequentially inputting the picture elements of the input interlaced scanning video signal into each of said first line memory, said second line memory and each of said plurality of sequential line memories in accordance with a write clock signal;

a first multiplexer connected to said first line memory, said second line memory and said plurality of sequential line memories, for producing a first output signal by multiplexing between the picture elements of the input interlaced scanning video signal stored in one of said first line memory, said second line memory and selected one from said plurality of sequential line memories in accordance with a read clock signal;

an interpolator for interpolating picture elements between adjacent scanning lines of the input interlaced scanning video signal in one of said odd field and said even field to produce interpolated picture elements;

a second multiplexer connected to said first multiplexer and said interpolator, for producing a second output signal representing a sequential scanning video signal by multiplexing between the picture elements contained in said first output signal and the interpolated picture elements provided from said interpolator; and a control section for controlling operations of said demultiplexer, said first and second multiplexers.

2. The device of claim 1, further comprising a clock generator for generating one of said read clock signal and said write clock signal in response to a horizontal synchronizing signal from the input interlaced scanning video signal.

3. The device of claim 2, further comprise of said control section comprising:

a synchronization detector for detecting said horizontal synchronizing signal from the input interlaced scanning video signal;

a line detector for counting the number of lines in a current field of the input interlaced scanning video signal;

a field detector for determining whether the current field of the input interlaced scanning video signal is one of said "odd" field and said "even" field; and a scanning line selector for generating a signal to select a data line produced from said second multiplexer to be displayed on a display screen according to the sequential number of scanning lines in the current field in which the interlaced scanning video signal is currently input.

4. The device of claim 1, wherein said plurality of sequential line memories corresponding to three sequential line memories.

5. A method of converting scanning patterns from interlaced scanning to sequential scanning in a video converting circuit comprising two line memories for an edge-line storage, a clock generator for controlling an output and storage of data representing an input interlaced scanning video signal, a synchronizing signal detector for detecting a synchronizing signal from the input interlaced scanning video signal, a control section including line and field detectors, and an interpolator for controlling conversion of the input interlaced video signal into a sequential scanning video signal, said method comprising the steps of:

storing data of the input interlaced scanning video signal in a first scan line of an odd field and a last scan line of an even field in the two line memories for an edge-line storage;

storing data of the input interlaced scanning video signal in the other scan lines in three sequential memories; and interpolating the data stored in the two line memories and the three sequential memories between adjacent scan lines to produce said sequential scanning video signal to be displayed on a screen.

6. The method of claim 5, further comprised of said clock generator generating a write clock-signal for controlling data storage of the two line memories and the three sequential memories, and alternately generating a read clock signal for controlling output of said sequential scanning video signal.

7. A device for converting scanning patterns from interlaced scanning to sequential scanning, comprising:

first memory means for storing picture elements of an input interlaced scanning video signal having alternating odd and even fields of scanning lines, in a first line of an odd field and in a last line of an even field;

second memory means for storing picture elements of the input interlaced scanning video signal in sequence for each scanning line;

input means for sequentially inputting the picture elements of the input interlaced scanning video signal into each of said first memory means and said second memory means;

interpolator means for interpolating picture elements between adjacent scanning lines of the input interlaced scanning video signal in one of said odd field and said even field to produce interpolated picture elements;

output means for outputting a sequential scanning video signal by multiplexing between the picture elements of the input interlaced scanning video signal stored in said first and second memory means and the interpolated picture elements provided from said interpolator means; and controller means for controlling operations of said input means and said output means.

8. The device of claim 7, further comprising a clock generator for generating, in response to a horizontal synchronizing signal, a write clock signal to control said input means to sequentially input the picture elements of the input interlaced scanning video signal into each of said first memory means and said second memory means, and alternately a read clock signal to control said output means to output said sequential scanning video signal.

9. The device of claim 8, further comprise of said controller means comprising:

a synchronization detector for detecting said horizontal synchronizing signal from the input interlaced scanning video signal;

a line detector for counting the number of lines in a current field of the input interlaced scanning video signal;

a field detector for determining whether the current field of the input interlaced scanning video signal is one of said "odd" field and said "even" field; and a scanning line selector for generating a signal to select a data line produced from a multiplexer to be displayed on a display screen according to the sequential number of scanning lines in the current field in which the interlaced scanning video signal is currently input.

10. The device of claim 7, further comprised of said first memory means corresponding to two line memories and said second memory means corresponding to three sequential memories.

* * * * *